(12) United States Patent
Kramer et al.

(10) Patent No.: US 8,964,538 B2
(45) Date of Patent: Feb. 24, 2015

(54) METHOD AND APPARATUS FOR SUPPORTING DIFFERENTIATED PERFORMANCE FOR MULTIPLE CATEGORIES OF PACKETS IN A PASSIVE OPTICAL NETWORK

(75) Inventors: Glen Kramer, Petaluma, CA (US);
Ryan Edgar Hirth, Windsor, CA (US);
Robin Grindley, San Rafael, CA (US);
Edward Wayne Boyd, Petaluma, CA (US)

(73) Assignee: Broadcom Corporation, Irvine, CA (US)

(*) Notice: Subject to any disclaimer, the term of this patent is extended or adjusted under 35 U.S.C. 154(b) by 725 days.

(21) Appl. No.: 13/173,206

(22) Filed: Jun. 30, 2011

(65) Prior Publication Data

US 2012/0076495 A1    Mar. 29, 2012

Related U.S. Application Data

(60) Provisional application No. 61/386,325, filed on Sep. 24, 2010.

(51) Int. Cl.
*H04L 12/26* (2006.01)
*H04Q 11/00* (2006.01)
*H04L 12/813* (2013.01)

(52) U.S. Cl.
CPC ............ *H04Q 11/0067* (2013.01); *H04L 47/20* (2013.01); *H04Q 2011/0064* (2013.01); *H04Q 2011/0084* (2013.01); *H04Q 2213/1301* (2013.01)
USPC .......................................................... 370/230

(58) Field of Classification Search
CPC ..... H04L 49/90; H04L 47/2408; H04L 47/20; H04L 49/352
USPC .............. 370/229, 230, 230.1, 231, 235–236, 370/389, 392, 394, 908, 909; 398/58, 66; 455/509; 709/223
See application file for complete search history.

(56) References Cited

U.S. PATENT DOCUMENTS

| 7,697,844 | B2 | 4/2010 | Guo et al. | |
|---|---|---|---|---|
| 2005/0120102 | A1* | 6/2005 | Gandhi et al. | 709/223 |
| 2007/0071031 | A1* | 3/2007 | Shin et al. | 370/468 |
| 2007/0153682 | A1 | 7/2007 | Swenson et al. | |
| 2010/0183304 | A1* | 7/2010 | Spector | 398/66 |
| 2012/0008948 | A1* | 1/2012 | Kazawa et al. | 398/58 |
| 2012/0148247 | A1* | 6/2012 | Skubic et al. | 398/58 |

FOREIGN PATENT DOCUMENTS

| CN | 101035389 A | 9/2007 |
|---|---|---|
| CN | 101399758 A | 4/2009 |
| CN | 101741603 A | 6/2010 |

OTHER PUBLICATIONS

English-Language Abstract for Chinese Patent Publication No. 101399758 A, published Apr. 1, 2009; 1 page.
English-Language Abstract for Chinese Patent Publication No. 101741603 A, published Jun. 16, 2010; 1 page.
First Office Action directed to related Chinese Patent Application No. 201110305986.X, mailed Nov. 11, 2013; 9 pages.
Office Action directed to related Chinese Patent Application No. 201110305986, mailed Aug. 5, 2014; 10 pages.
English-language abstract of Chinese Patent Application Publication No. 101193061 A; 1 page.

* cited by examiner

*Primary Examiner* — Obaidul Huq
*Assistant Examiner* — Ricardo Castaneyra
(74) *Attorney, Agent, or Firm* — Sterne, Kessler, Goldstein & Fox P.L.L.C.

(57) ABSTRACT

Embodiments of an apparatus including a user network interface configured to receive from a network a packet to be transmitted upstream over a PON are provided herein. The packet is marked with a first category type or a second category type. The apparatus further includes an upstream first in, first out (FIFO) queue configured to store the packet if the packet is marked with the first category type or the second category type.

20 Claims, 9 Drawing Sheets

METHOD AND APPARATUS FOR SUPPORTING DIFFERENTIATED PERFORMANCE FOR MULTIPLE CATEGORIES OF PACKETS IN A PASSIVE OPTICAL NETWORK

CROSS REFERENCE TO RELATED APPLICATIONS

This application claims the benefit of U.S. Provisional Patent Application No. 61/386,325, filed Sep. 24, 2010, which is incorporated herein by reference in its entirety.

FIELD OF THE INVENTION

This application relates generally to passive optical networks (PONs). More particularly, this application relates to a method and apparatus for supporting differentiated performance for multiple categories of packets in a PON.

BACKGROUND

The portion of the public network from the central office to the end user's location is called the access network or "last mile." The access network connects the end user to the backbone or core network via the central office. To keep pace with increasing voice, data, and video traffic, network operators have, in many areas, upgraded existing access networks by deploying optical fibers deeper into the last mile to shorten the lengths of existing copper and coaxial networks. Among different competing optical network technologies, passive optical networks (PONs) have been one of the favored choices for these next-generation access networks. With the large bandwidth of optical fibers, PONs can accommodate bandwidth-intensive voice, data, and video services.

FIG. 1 illustrates an exemplary PON 100 that communicatively couples a central office 110 to a single family unit (SFU) 120 and a multi-dwelling unit (MDU) 130 (i.e., a structure housing two or more residential or business units). Transmissions within PON 100 are specifically performed between an optical line terminal (OLT) at central office 110 and optical network units (ONUs) at SFU 120 and MDU 130 over optical fibers that span the distance between them. The OLT at central office 110 couples PON 100 at its end to the backbone or core network (not shown), which can be an external network belonging to, for example, an Internet service provider (ISP) or a local exchange carrier. In addition, the ONUs at SFU 120 and MDU 130 further couple PON 100 at their ends to home or business networks (also not shown). This network structure allows end user devices coupled to the home or business networks within SFU 120 and MDU 130 to send data to and receive data from the backbone or core network over PON 100.

The portion of PON 100 closest to central office 110 is commonly referred to as the feeder area 150. This area includes one or more feeder cables that each has multiple fibers. Passive optical splitters/combiners 140 are used to split the individual fibers of the feeder cables into multiple distribution fibers that fall within the second portion of PON 100, which is commonly referred to as the distribution area 160. The distribution fibers are then farther split by additional passive optical splitters/combiners 140 into multiple drop fibers that extend to SFU 120 and MDU 130. The drop fibers fall within the third and final portion of PON 100, which is commonly referred to as the drop area 170.

It should be noted that PON 100 illustrates only one exemplary PON and fiber distribution topology (i.e., a tree topology) and that other point-to-multipoint fiber distribution topologies, such as ring and mesh topologies, are possible.

In prior access networks, distribution area 160 and/or drop area 170 were deployed using copper and coaxial cables. By extending fiber cables deeper into the access network, all the way to the home, building, or curb, for example, PON 100 can accommodate bandwidth-intensive voice, data, and video services that these prior access networks could not handle. As illustrated in FIG. 1, the only remaining portion of the network between central office 110 and an end user's device at SFU 120 and MDU 130 that potentially is not optically connected is within the local area networks at these locations (i.e., within metallic area 180). Over such short copper and/or coaxial wiring distances, current local area network technology generally provides adequate bandwidth.

During operation of the access network illustrated in FIG. 1, signals sent downstream over the three portions of PON 100 by the OLT at central office 110 are split by passive optical splitters/combiners 140 and are received by the ONUs at SFU 120 and MDU 130. Conversely, signals sent upstream over these three portions of PON 100 by the ONUs at SFU 120 and MDU 130 are combined by passive optical splitters/combiners 140 and are received by the OLT at central office 110. To prevent collisions in the upstream direction and to share the upstream capacity of PON 100, the OLT at central office 110 and the ONUs at SFU 120 and MDU 130 implement some form of arbitration mechanism.

For example, many PONs implement a non-contention based media access scheme that grants each ONU access to the shared medium for a limited interval of time for transmitting data upstream. This limited interval of time is commonly referred to as a time slot. FIG. 2 illustrates an example of data being sent upstream over a PON in accordance with such a non-contention based media access scheme. In FIG. 2, each ONU 1 through N is synchronized to a common time reference and is allocated a timeslot for transmitting one or more packets of data upstream to the OLT. More specifically, each ONU 1 through N buffers packets received from an attached end user and bursts one or more of the buffered packets upstream to the OLT when its assigned timeslot arrives. For example, ONU 1 receives two packets of data from attached user 1, buffers the two packets of data, and bursts the two packets upstream during a first timeslot assigned to ONU 1. ONU 2 receives a single packet of data from attached user 2, buffers the packet of data, and bursts the single packet upstream during a second timeslot assigned to ONU 2. As can be seen from FIG. 2, the time slots are assigned to the ONUs such that they do not overlap in time, thereby preventing upstream collisions.

Beyond simply assigning time slots such that they do not overlap in time, the exact method of when and how much capacity is granted to a particular ONU in such a non-contention based media access scheme can greatly affect the performance of the PON. In most conventional PONS, each ONU is either assigned a static time slot of fixed capacity within a repeating interval (i.e., in accordance with a static TDMA scheme) or are dynamically assigned time slots of varying capacities based on the instantaneous amount of data buffered by every ONU (i.e., in accordance with a statistical multiplexing scheme).

Static TDMA is advantageous because ONUs are guaranteed a predetermined, fixed amount of upstream bandwidth. However, the inflexibility of the amount of upstream bandwidth assigned to each ONU using static TDMA often leads to inefficient use of upstream bandwidth—ONUs with little or no data to transmit upstream are still allocated their fixed share of bandwidth even though other ONUs may be waiting to send large amounts of data upstream. In other words, static TDMA does not allow unused upstream bandwidth to be transferred to ONUs that can make use of the excess bandwidth. Statistical multiplexing, on the other hand, allows upstream bandwidth to be more efficiently allocated to ONUs based on need. However, statistical multiplexing generally does not guarantee a predetermined, minimum amount of upstream bandwidth to ONUs.

Therefore, what is needed is a method and apparatus for allowing upstream bandwidth to be flexibly allocated among ONUs, while still guaranteeing a predetermined, minimum amount of upstream bandwidth to the ONUs.

A more broadly stated problem with PONS, in general, is that there is no adequate mechanism to provide differentiated performance for multiple, different categories of packets. More specifically, there is generally no adequate mechanism to provide differentiated performance for packets, received at an ONU and to be sent upstream over a PON, that are marked with, or classified as belonging to, different types of categories. Category types can be based on minimum and maximum bandwidth allocations to an ONU, size of packets, type of packets, or content of packets, to name a few.

Therefore, what is more broadly needed is a method and apparatus for providing differentiated performance for multiple categories of packets in a PON.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Referring now to the specifics of the present invention, service providers often require the ability to control the amount of data that subscribers push upstream over the network such that a subscriber receives at least a predetermined, minimum amount of upstream bandwidth and can utilize excess upstream bandwidth above the minimum amount when available. Described below is a method and apparatus for implementing a control scheme capable of achieving these and other objectives in a PON based network. In general, the control scheme can meter packets to be sent upstream to determine whether they are in conformance with a service agreement (and at what level of conformance) and drop those packets to be sent upstream that are not in conformance.

Figure 1:
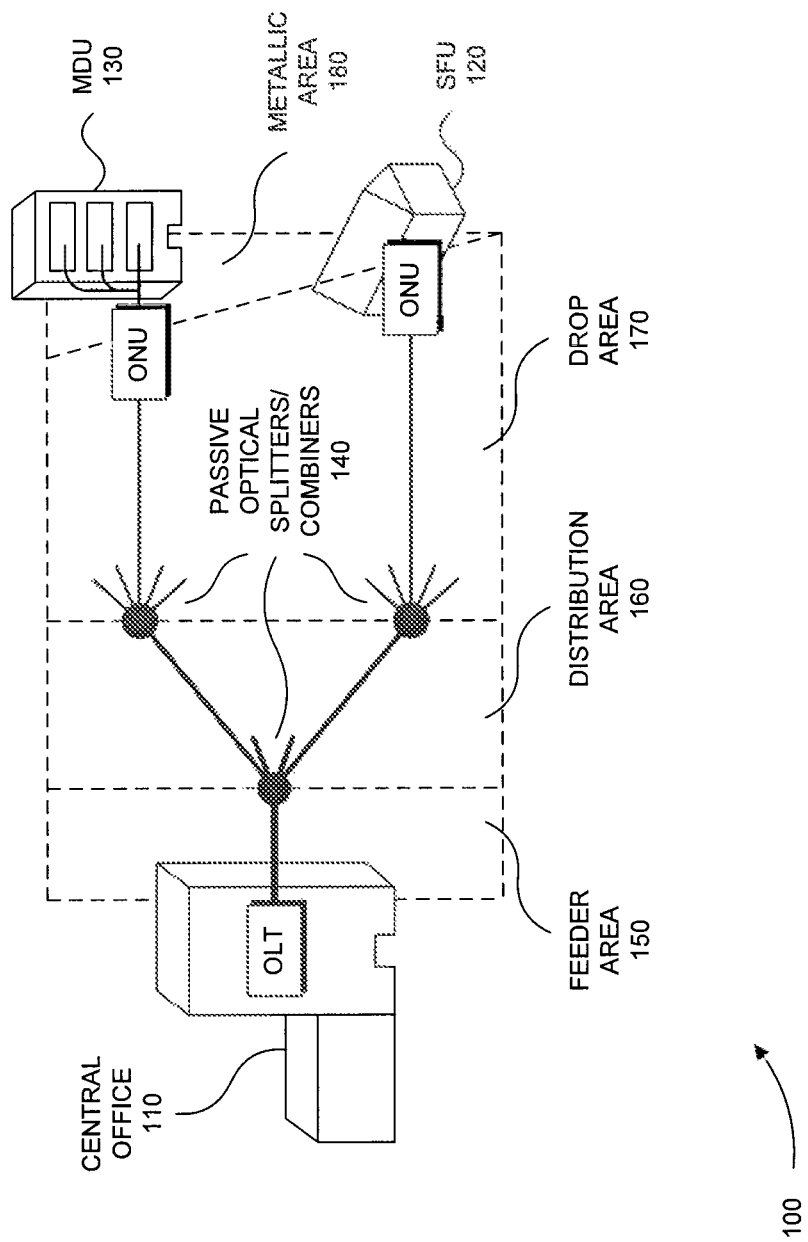
FIG. 1 illustrates an exemplary PON.
Figure 2:
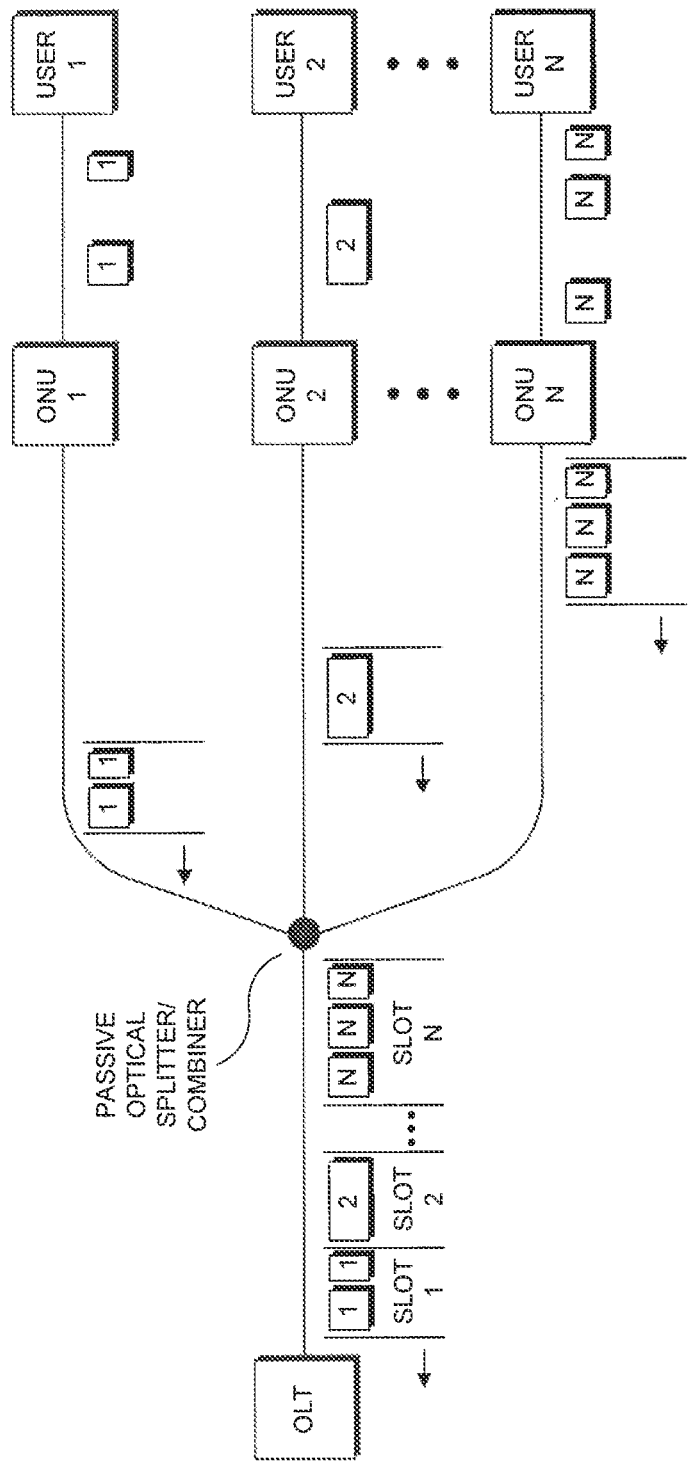
FIG. 2 illustrates data being sent upstream over a PON in accordance with a non-contention based media access scheme.
Figure 3:
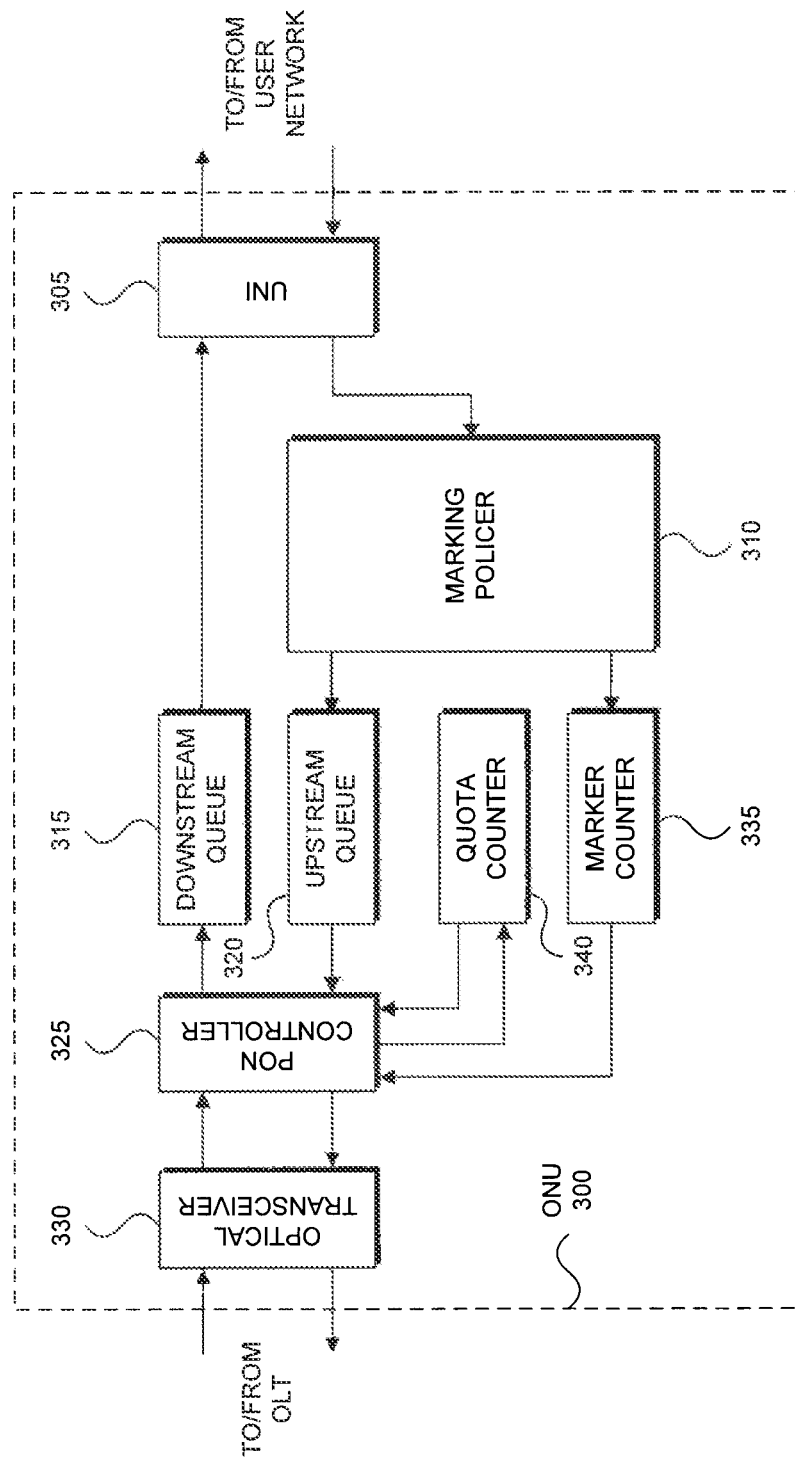
FIG. 3 illustrates an ONU, according to embodiments of the present invention.

FIG. 3 illustrates an ONU 300 configured to at least partially implement this control scheme in a PON based network, according to embodiments of the present invention. ONU 300 includes a user network interface (UNI) 305, a marking policer 310, a downstream queue 315, an upstream queue 320, a PON controller 325, an optical transceiver 330, a marker counter 335, and a quota counter 340.

In the downstream direction, optical transceiver 330 receives an optical signal transmitted from an OLT over a PON. Data in the form of packets are recovered from the optical signal and are provided to PON controller 325 in an electrical format. PON controller 325 determines whether the packets are addressed to ONU 300 by, for example, examining each packet for a logical link identifier (LLID). If the LLID of the packet matches the LLID (or one of the LLIDs) assigned to ONU 300, the packet is accepted and is passed on to downstream queue 315 for buffering. If, on the other hand, the packet does not match the LLID (or one of the LLIDs) assigned to ONU 300, the packet is discarded by PON controller 325. The packets buffered in downstream queue 315 are subsequently transmitted to the user network via UNI 305.

In the upstream direction, packets of data to be transmitted to the OLT over the PON are initially received from the user network via UNI 305. Marking policer 310 then meters these packets received from the user network to determine whether they are in conformance with a service agreement (or some other service policy or plan). If a packet is in conformance with the service agreement, the packet is marked with its level of conformance and stored in upstream queue 320. However, if the packet is not in conformance with the service agreement, the packet is dropped by marking policer 310 and is not buffered by upstream queue 320 or transmitted upstream to the OLT over the PON. In one embodiment, marking policer 310 determines whether a packet is in conformance with the service agreement using four values (or close alternatives to these values): the committed information rate (CIR), the committed burst size (CBS), the peak information rate (PIR), and the peak burst size (PBS).

The CIR is the upstream data rate guaranteed by the service provider to the user network attached to UNI 305. In general, all traffic presented by the user network to UNI 305 for transmission upstream at a rate less than or equal to the CIR will be transmitted upstream with a high probability. The PIR is the maximum upstream data rate the service provider will provide to the user network attached to UNI 305. All traffic presented by the user network to UNI 305 for transmission upstream that is in excess of the CIR but is less than the PIR is eligible, but not guaranteed, to be transmitted. For example, if the current network utilization of the PON can handle extra upstream load from the user network, while still providing for all other committed traffic, the service provider may allow the user network to transmit data upstream at a rate higher than the CIR but less than the PIR.

Although these two rates, CIR and PIR, can be used to guarantee a predetermined minimum and maximum amount of upstream bandwidth to a user network, they do not provide, by themselves, adequate support for the bursty nature of upstream user traffic. The CBS and the PBS provide this additional support. These two values and the entire metering process in general, can be best understood with further reference to FIG. 4.

Figure 4:
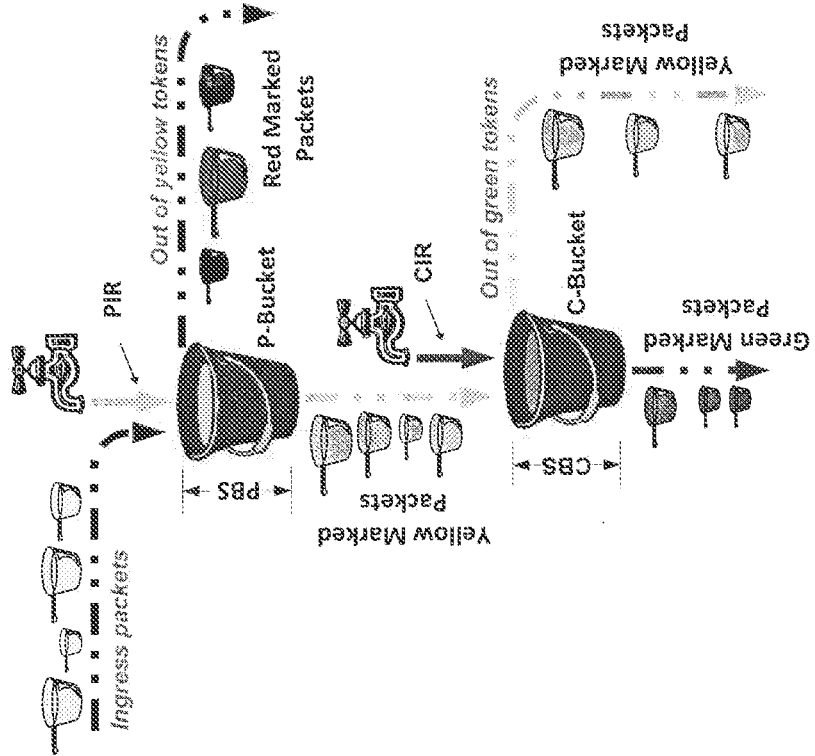
FIG. 4 illustrates a model of an exemplary metering process that can implemented by the ONU in FIG. 3, according to embodiments of the present invention.

FIG. 4 illustrates a model 400 of an exemplary metering process that can be implemented by marking policer 310 and how the four values, CIR, PIR, CBS, and PBS, come in to play within this process. As illustrated in FIG. 4, there are two "buckets," each of which can be implemented as a counter. The first bucket is the peak bucket, or p-bucket, and the second bucket is the committed bucket, or c-bucket. These two buckets are configured to "retain" tokens, each of which confers at least the potential to transmit a bit of information (or some other amount of information, such as a byte) upstream over the PON. Assuming these two buckets are actually implemented using counters, the count value can reflect the number of tokens currently "retained" by the bucket.

The p-bucket is replenished with tokens at the PIR and can store a maximum number of tokens specified by the PBS. As packets of data come into marking policer 310 (labeled as ingress packets in FIG. 4), each packet is marked with either a yellow marker or a red marker. A packet is marked yellow if there is at least one token in the p-bucket for every bit of information in the packet (assuming each token confers at least the potential to transfer one bit of information) and, once marked, those tokens covering the packet are removed from the p-bucket. A yellow marked packet indicates that the packet's current level of conformance is above the CIR, but at or below the PIR, and is therefore eligible, but not guaranteed, to be transmitted upstream. If, on the other hand, the p-bucket currently does not have enough tokens to cover the packet, the packet is marked red and no tokens are removed from the p-bucket. A red marked packet indicates that the packet's current level of conformance is above the PIR and should be discarded.

After this initial marking is performed, all yellow marked packets are further metered by the c-bucket. The c-bucket is replenished with tokens at the CIR and can store a maximum number of tokens specified by the CBS. As yellow marked packets of data come in, each is either left as yellow, or remarked as green. A packet is marked green if there is at least one token in the c-bucket for every bit of information in the packet (assuming each token confers the right to transfer one bit of information) and, once marked, those tokens covering the packet are removed from the c-bucket. A green marked packet indicates that the packet's current level of conformance is at or below the CIR and is guaranteed to be transmitted upstream with a high probability. If on the other hand, the c-bucket currently does not have enough tokens to cover the packet, the packet is left as yellow.

Figure 5:
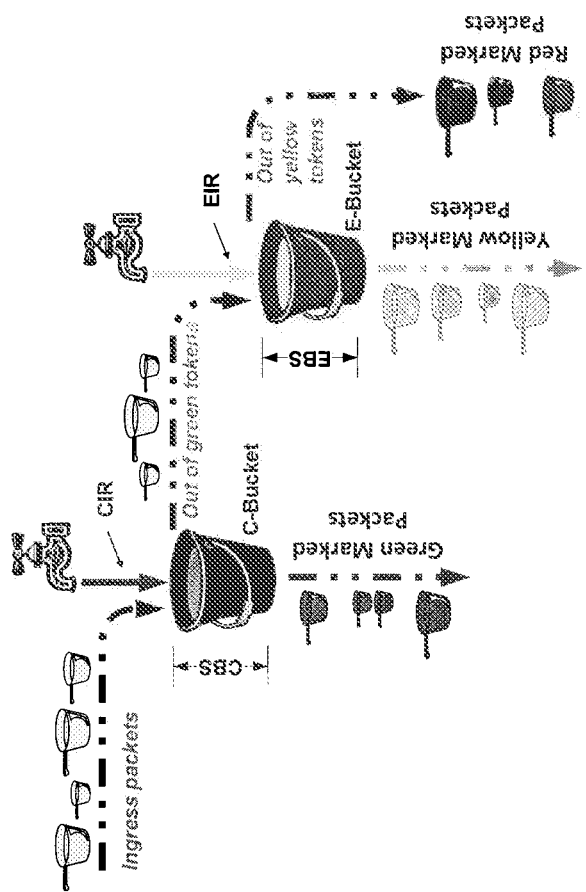
FIG. 5 illustrates another model of an exemplary metering process that can be implemented by the ONU in FIG. 3, according to embodiments of the present invention.

FIG. 5 illustrates another model 500 of an exemplary metering process that can be implemented by marking policer 310. Instead of using the four values, CIR, PIR, CBS, and PBS, model 500 uses two, new values in place of the PIR and PBS values. These two, new values are the excess information rate (EIR) and the excess burst size (EBS). In general, the EIR is simply the difference between the PIR and the CIR, and the EBS is simply the difference between the PBS and the CBS.

As illustrated in FIG. 5, there are again "two buckets," which can be implemented as counters. The first bucket is the committed bucket, or c-bucket, which was described above, and the second bucket is the excess bucket, or e-bucket. These two buckets are configured to "retain" tokens, each of which confers at least the potential to transmit a bit of information (or some other amount of information, such as a byte) upstream over the PON. Assuming these two buckets are actually implemented using counters, the count value can reflect the number of tokens currently "retained" by the bucket.

The c-bucket is replenished with tokens at the CIR and can store a maximum number of tokens specified by the CBS. As packets of data come into marking policer 310 (labeled as ingress packets in FIG. 5), each packet is either marked with a green marker or is passed on to the e-bucket for further processing. A packet is marked green if there is at least one token in the c-bucket for every bit of information in the packet (assuming each token confers the right to transfer one bit of information) and, once marked, those tokens covering the packet are removed from the c-bucket. A green marked packet indicates that the packet's current level of conformance is at or below the CIR and is guaranteed to be transmitted upstream with a high probability. If, on the other hand, the c-bucket currently does not have enough tokens to cover the packet, the packet is left unmarked and is passed on to the e-bucket for further processing.

The e-bucket is replenished with tokens at the EIR and can store a maximum number of tokens specified by the EBS. As the packets of data come in, each is marked with a yellow marker or a red marker. A packet is marked yellow if there is at least one token in the e-bucket for every bit of information in the packet (assuming each token confers at least the potential to transfer one bit of information) and those tokens covering the packet are then removed from the e-bucket. A yellow marked packet indicates that the packet's current level of conformance is above the CIR, but at or below the PIR, and is therefore eligible, but not guaranteed, to be transmitted upstream. If, on the other hand, the e-bucket currently does not have enough tokens to cover the packet, the packet is marked red. A red marked packet indicates that the packet's current level of conformance is above the PIR and should be discarded.

It should be noted that models 400 and 500 illustrated in FIGS. 4 and 5 can be expanded to include additional levels of conformance (i.e., more than the three levels of conformance described above), as would be appreciated by one of ordinary skill in the art. It should be further noted that the use of colors as "markers" is an arbitrary choice and is used herein only for exemplary purposes. In general, the levels of conformance can be designated or referred to as being "marked" with any reasonable type of marker, as would be further appreciated by one of ordinary skill in the art.

In addition, although the green marker type was described above as being used to indicate packets that are guaranteed to be transmitted upstream with a high probability, the yellow marker type was described above as being used to indicate packets that are eligible but not guaranteed to be transmitted upstream, and the red marker type was described above as being used to indicate packets that are not to be transmitted upstream, other broader, alternative indications for these marker types are possible. For example, each marker type can represent a level of effort or priority that will be applied by the PON system to transmit a packet upstream. In this example, the green marker type can indicate the highest level of effort or priority that will be applied by the PON system to transmit a packet upstream, the yellow marker type can indicate the second highest level of effort or priority that will be applied by the PON system to transmit a packet upstream, and the red marker type can indicate the lowest level of effort or priority that will be applied by the PON system to transmit a packet upstream.

It should be further noted that, rather than marking packets with their level of conformance, packets can simply be classified according to their level of conformance, as would be appreciated by one of ordinary skill in the art. In this instance, marking policer 310 can be replaced with a classifier.

Figure 6:
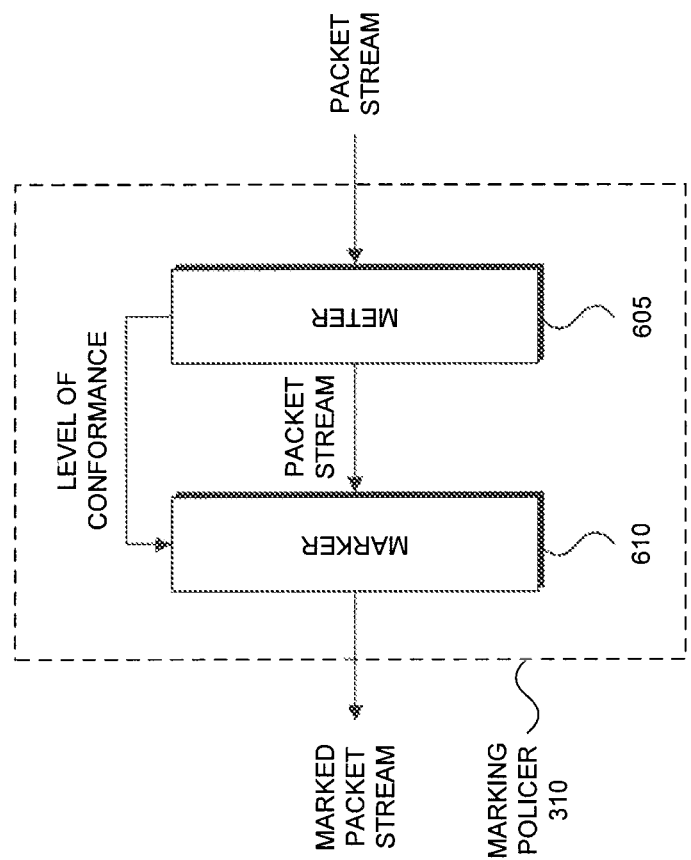
FIG. 6 illustrates a block diagram of an exemplary implementation of a marking policer, according to embodiments of the presented invention.

Referring now to FIG. 6, a block diagram of an exemplary implementation of marking policer 310 is illustrated in accordance with embodiments of the present invention. As illustrated in FIG. 6, marking policer 310 includes a meter 605 and a marker 610. Meter 605 receives a packet stream and meters each packet in the stream to determine its level of conformance. For example, meter 605 can implement either model 400 illustrated in FIG. 4 or model 500 illustrated in FIG. 5. Once determined, the level of conformance for a packet is passed to marker 610, which then marks the packet with the specified level. The marked packet stream is then provided as output.

It should be noted that, in one embodiment, the packet stream received by marking policer 310 can be already marked. For example, the devices in the user network generating the upstream packets can meter and mark the packets appropriately. In this scenario, meter 605 can simply read the marker type for each packet and pass the same marker type on to marker 610 for remarking, or marking policer 310 can be completely omitted from, or bypassed in, ONU 300 illustrated in FIG. 3.

Referring back to FIG. 3, regardless of the exact metering method employed by marking policer 310, all green and yellow marked packets (i.e., all packets at least eligible to be transmitted upstream) are stored in upstream queue 320 for potential transmission upstream over the PON, while all red marked or classified packets are discarded and are not stored in upstream queue 320. In an embodiment, upstream queue 320 is a first in, first out (FIFO) queue and packets which are queued first are removed from the head of upstream queue 320 for potential transmission upstream before later queued packets. In other words, packets are dequeued for potential transmission upstream from upstream queue 320 based on the order in which they were stored.

Marker counter 335 is configured to maintain count values that reflect the amount of data stored in upstream queue 320 marked with a particular marker type. In one embodiment, marker counter 335 maintains at least two count values: one for counting the amount of data stored in upstream queue 320 that is marked with the green marker type and one for counting the amount of data stored in upstream queue 320 marked with the yellow marker type. The count values can be maintained based on any reasonable unit of measure, including by number of bits or bytes. These count values, as will be explained further below, are used by PON controller 325 to gain permission to transmit some, or all, of the packets stored in upstream queue 320 upstream.

As mentioned briefly above, the channel capacity of a PON, such as the PON coupled to ONU 300, is shared by multiple ONUS in the upstream direction. As a result, upstream transmissions from each ONU attached to the PON are arbitrated to avoid collisions. This arbitration can be achieved by having the OLT allocate grants (also called time slots) to each ONU. In this scheme, an ONU defers upstream data transmissions until it receives a grant from the OLT. In order to receive a grant, an ONU generates and transmits an upstream message to the OLT called a REPORT message that informs the OLT of its respective upstream queue status. The OLT uses this information sent from one or more of the ONUS requesting upstream bandwidth to generate and transmit respective GATE messages to those ONUs. Each GATE message allocates an upstream transmission grant (or time slot) to an ONU.

In ONU 300, PON controller 325 generates a REPORT message and transmits it upstream to the OLT to which it is coupled. PON controller 325 specifically includes the count values maintained by marker counter 335 in its REPORT message. The count values maintained by marker counter 335 respectively indicate the amount of data stored in upstream queue 320 marked with the green marker type and the amount of data stored in upstream queue 320 marked with the yellow marker type. PON controller 325 can further include other count values maintained by marker counter 335 when, for example, packets marked with other levels of conformance (i.e., other than green and yellow) are stored in upstream queue 320.

In one embodiment, PON controller 325 simply includes the count values maintained by marker counter 325 in the REPORT message as separate values. In another embodiment, PON controller 325 includes one or more cumulative count values, generated based on the count values maintained by marker counter 325, in the REPORT message. For example, PON controller 325 can include the following values in the REPORT message: the count value indicating the amount of data stored in upstream queue 320 that is marked with the green marker type, and a cumulative count value equal to the sum of the count values indicating the amount of data stored in upstream queue 320 that are marked with the green and yellow marker types.

Once generated, PON controller 325 transmits the REPORT message upstream to the OLT over the PON via optical transceiver 330. In response, the OLT will generate a GATE message conveying a grant or time slot to ONU 300. Under nominal circumstances, the OLT can provide a grant to ONU 300 that is sufficient to transmit all green marked packets (i.e., packets guaranteed to be transmitted upstream with a high probability, or packets associated with the highest level of effort or priority to be applied by the PON system to transmit them upstream) that are stored in upstream queue 320. If the grant is not only sufficient, but exceeds what is required to transmit all green marked packets stored in upstream queue 320, the excess upstream bandwidth can be used to transmit some or all yellow marked packets (i.e., packets that are eligible but not guaranteed to be transmitted upstream, or packets associated with the second highest level of effort or priority to be applied by the PON system to transmit them upstream) that are stored in upstream queue 320.

More specifically, once ONU 300 receives the GATE message from the OLT, PON controller 325 processes the GATE message and determines upstream quota counts for each marker type used to mark data stored in upstream queue 320. In an embodiment, PON controller determines a quota count for the green and yellow marker types by taking the total grant (measured in some unit of data, such as bits or bytes) and comparing the total grant to the amount of data stored in upstream queue 320 that is marked with the green marker type. If the total grant is larger than the amount of data stored in upstream queue 320 marked with the green marker type, the quota count for the green marker type is set equal to the total amount of data stored in upstream queue 320 marked with the green marker type and the quota count for the yellow marker type is set equal to the difference between the total grant and the amount of data stored in upstream a queue 320 marked with the green marker type. If, on the other hand, the total grant is less than the amount of data stored in upstream queue 320 marked with the green marker type, the quota count for the green marker type is set equal to the total grant and the quota count for the yellow marker type is set equal to zero.

In general, the total grant is first used to meet the amount of data stored in upstream queue 320 marked with the marker type indicating packets guaranteed to be transmitted upstream with a high probability, or packets associated with the highest level of effort or priority to be applied by the PON system to transmit them upstream, then any remaining portion of the total grant is used to meet the amount of data stored in upstream queue 320 marked with the marker type indicating packets with the second highest probability, or packets associated with the second highest level of effort or priority to be applied by the PON system to transmit them upstream, etc. For example, this pattern would continue with any remaining portion of the total quota count going to any data stored in upstream queue 320 marked with the marker type indicating packets with the third highest probability, or packets associated with the third highest level of effort or priority to be applied by the PON system to transmit them upstream.

The calculated quota count values are subsequently used to initialize two count values maintained by quota counter 340 (assuming only data marked with two marker types are stored in upstream queue 320): a first count value maintained by quota counter 340 is initialized to the quota count for the green marker type, and the second count value maintained by quota counter 340 is initialized to the quota count for the yellow marker type. Additional count values can be maintained by quota counter 340 where additional marker types are used.

Once initialized, PON controller 325 begins to remove packets from the head of upstream queue 320 for potential transmission upstream. More specifically, PON controller 325 removes a packet from the head of upstream queue 320 and determines the marker type of the packet and whether the amount of data of the packet exceeds the count value maintained by quota counter 340 corresponding to that marker type. The corresponding count value maintained by quota counter 340 reflects the amount of data, marked with that marker type, that can be transmitted.

If the amount of data of the packet does not exceed the corresponding count value, the packet is prepared for transmission upstream by PON controller 325 during the time slot assigned to ONU 300 and the count value is decremented by an amount corresponding to the amount of data of the packet. If, on the other hand, the amount of data of the packet does exceed the corresponding count value, the packet is discarded.

In an embodiment, packets are removed from the head of upstream queue 320 until the first and second count values, maintained by quota counter 340, are each decremented to zero. In another embodiment, packets are removed from the head of upstream queue 320 until the first count value, maintained by quota counter 340, is decremented to zero. In yet another embodiment, packets removed from the head of upstream queue 320 that do not exceed the count value maintained by quota counter 340 corresponding to the marker type of the packet are transmitted upstream by PON controller 325 in the order in which they are removed from upstream queue 320.

It is important to note that the above description of queuing marked packets in upstream queue 320, maintaining count values that reflect the amount of data stored in upstream queue 320 marked with particular marker types, generating and transmitting a REPORT message to the OLT conveying the maintained count values, receiving and processing a GATE message from the OLT to determine upstream quota counts for each marker type, and removing packets from the head of upstream queue 320 and determining whether they should be prepared for upstream transmission based on the quota counts are all independent of the exact mechanism and method used to mark or classify the packets presented to upstream queue 320 for queuing. In other words, these aspects of the present invention can be performed regardless of whether the packets are marked with, or classified as belonging to, different levels of conformance based on rates and burst sizes (e.g., committed and peak information rates), or based on some other criteria, such as type of packet, content of packet, or size of packet, to name a few.

For example, for video data, there are three major frame types commonly used: I-frames, P-frames, and B-frames. In general, I-frames are more critical for proper playback of video than P-frames and B-frames. Thus, packets of data carrying I-frame information can be marked with different levels of conformance than packets of data carrying P-frame information or B-frame information. That is, packets of data carrying I-frame information can be marked with a level of conformance indicating that those packets are to be transmitted upstream with a high probability or can be marked with a level of conformance indicating that that those packet are to receive a high-level of effort or priority by the PON system to transmit them upstream. Packets of data carrying P-frame information or B-frame information, on the other hand can be marked with a level of conformance indicating that that those packets are to be transmitted upstream with a probability less than packets of data carrying I-frame information or can be marked with a level of conformance indicating that those packets are to receive a level of effort or priority from the PON system to transmit them upstream that is less than the level of effort or priority received by packets of data carrying I-frame information.

It should be further noted that, if packets are marked based on criteria other than rates and burst sizes, rather than saying the packets are marked with, or classified as belonging to, different levels of conformance based on the different criteria, it can be said that the each packet is marked or classified as belonging to a particular category among a group of different categories based on the different criteria.

Figure 7:
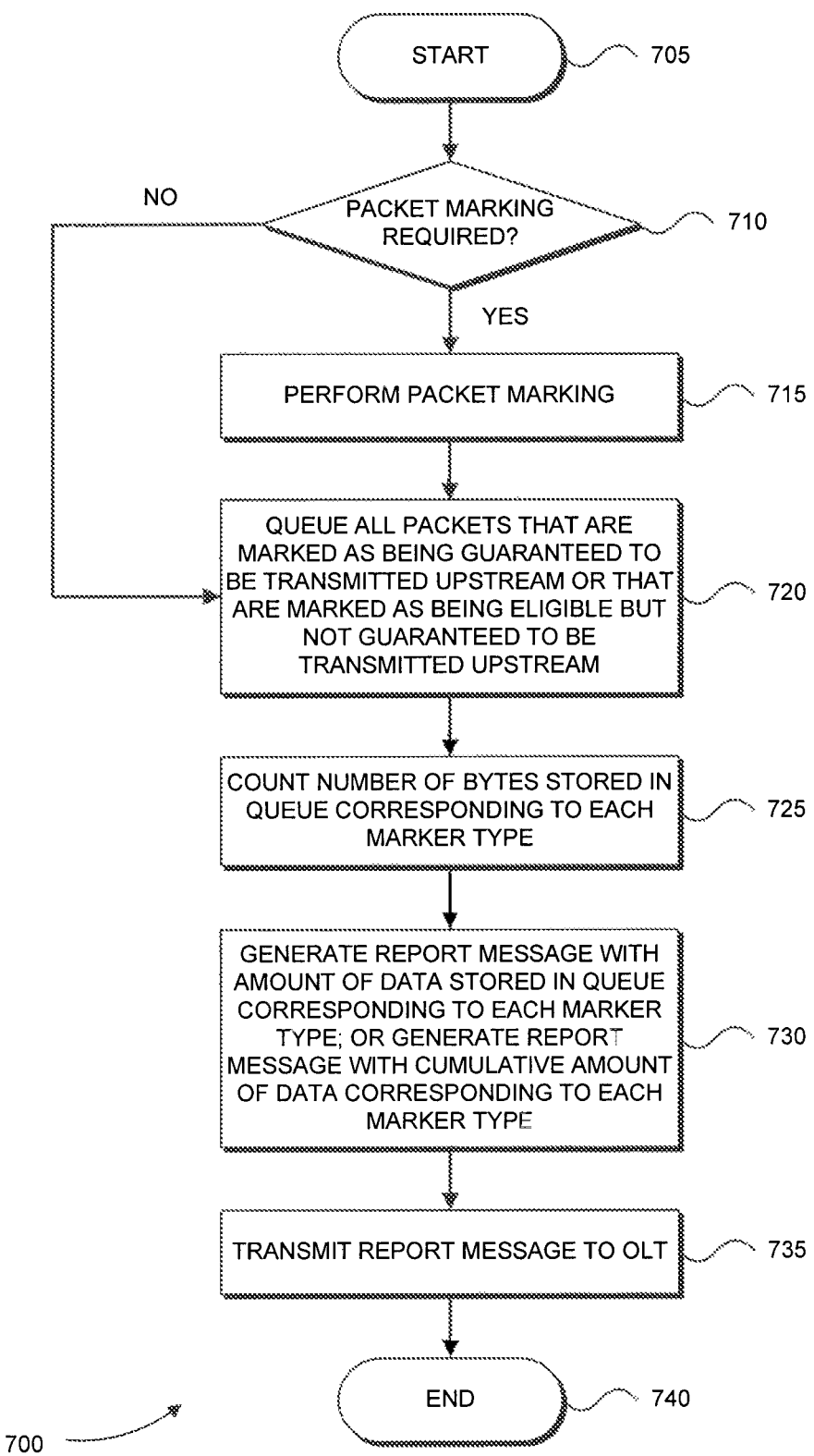
FIG. 7 illustrates a flowchart for classifying and queuing packets received from a user network and generating a REPORT message at an ONU, according to embodiments of the present invention.

Referring now to FIG. 7, a flowchart 700 for classifying and queuing packets received from a user network and generating a REPORT message at an ONU is illustrated, according to embodiments of the present invention. Flowchart 700 is described with continued reference to exemplary GNU 300 depicted in FIG. 3. However, flowchart 700 is not limited to that embodiment.

Flowchart 700 starts at step 705 and transitions to step 710. In step 710, a determination is made as to whether packets received from the user network, via UNI 305, require marking. For example, if the packets received from the user network are already marked, packet marking can be foregone and flowchart 700 can transition directly to 720. If, on the other hand, marking is required, or it is desired to remark the packets, flowchart 700 first transitions to step 715.

In step 715, marking policer 310 meters and marks the packets with their level of conformance. The metering and marking process can conform to the models illustrated in FIGS. 4 and 5, as discussed above. In another embodiment, the marking process can mark packets with different levels of conformance based on something other rates (e.g., other than committed and peak information rates). For example, the marking process can mark packets with different levels of conformance based type of packet or size of packet. It should be noted that, in the situation where the packets received from the user network are already marked, the packets can be marked in accordance with different levels of conformance based on these (i.e., type of packet or size of packet) and other alternative criteria.

In step 720, those packets marked as being guaranteed to be transmitted upstream with a high probability (e.g., marked as being green) or those packets that are marked as being eligible, but not guaranteed, to be transmitted upstream are queued in upstream queue 320. Again, it should be noted that marker types can represent effort or priority levels.

In step 725, count values that reflect the amount of data stored in upstream queue 320 marked with a particular marker type are determined and maintained by marker counter 335. The count values may be maintained based on any reasonable unit of measure, including by number of bits or bytes.

In step 730, a REPORT message is generated by PON controller 325 that conveys the count values maintained by marker counter 335. The count values can be conveyed either as separate values or as cumulative amounts as discussed above.

In step 735, the REPORT message is transmitted upstream over the PON to the OLT.

Figure 8:
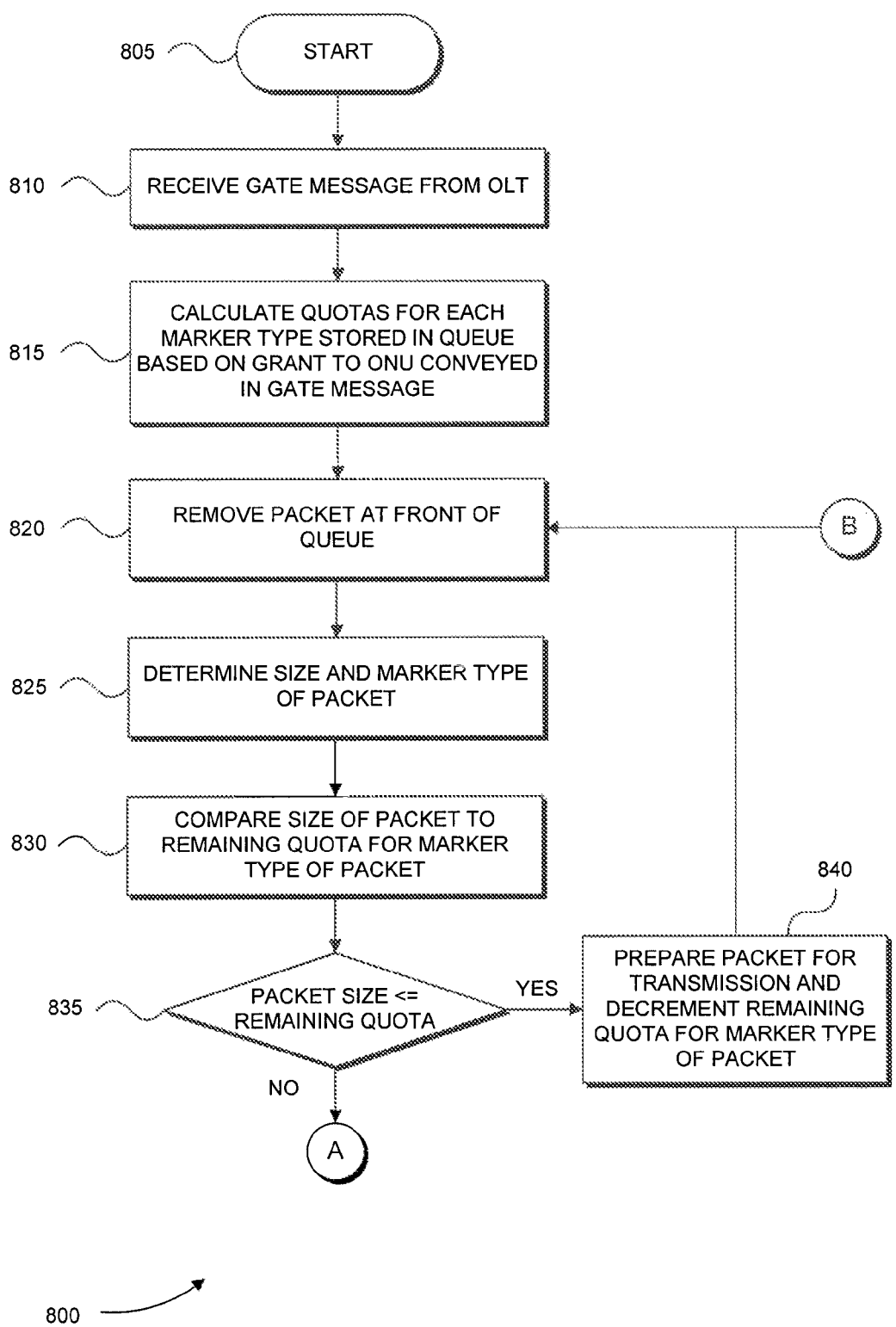
FIG. 8 illustrates a flowchart for determining which packets received from a user network, marked with their level of conformance, and stored in a FIFO queue are to be transmitted upstream over a PON, according to embodiments of the presented invention.
Figure 8:
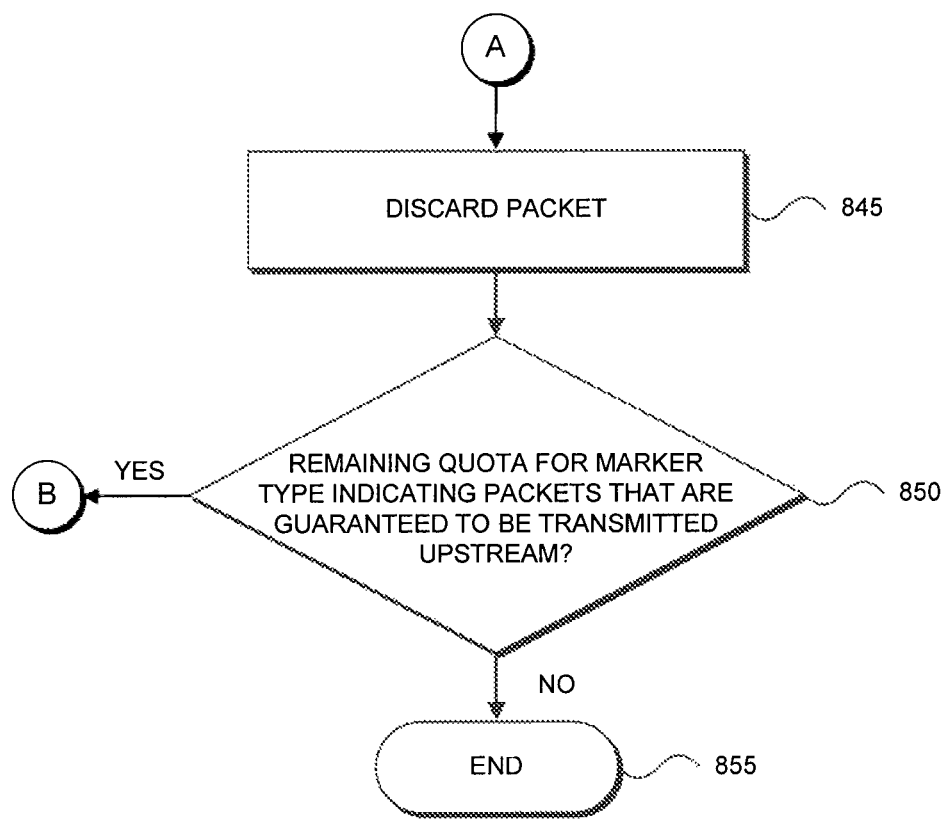

Referring now to FIG. 8, a flowchart 800 for determining which packets received from a user network that are marked with their level of conformance and stored in a FIFO queue are to be transmitted upstream over a PON is illustrated, according to embodiments of the present invention. Flowchart 800 is described with continued reference to exemplary ONU 300 depicted in FIG. 3. However, flowchart 800 is not limited to that embodiment.

Flowchart 800 starts at step 805 and transitions to step 810. In step 810, a GATE message is received from an OLT granting ONU 300 an upstream transmission opportunity.

In step 815, PON controller 325 processes the GATE message and determines upstream quota counts for each marker type used to mark data stored in upstream queue 320 based on an upstream grant to ONU 300 conveyed in the GATE message.

In step 820, PON controller 325 removes a packet from the head of upstream queue 320.

In step 825, PON controller 325 determines the size of the packet removed from the head of upstream queue 320 and its marker type.

In step 830, PON controller 325 compares the size of the packet to the remaining quota count, which is maintained by quota counter 340, corresponding to the marker type of the packet.

In step 835, PON controller 325 makes a decision: if the packet size is less than or equal to the remaining quota count, flowchart 800 transitions to step 840, else flowchart 800 transitions to step 845.

Assuming the packet size is less than or equal to the remaining quota count, flowchart 800 transitions to step 840 and PON controller 325 prepares the packet for transmission upstream and decrements the remaining quota count corresponding to the marker type of the packet based on the size of the packet. From step 840, flowchart 800 transitions back to step 820 where the next packet at the head of upstream queue 320 is removed.

Assuming the packet size is greater than the remaining quota count, flowchart 800 transitions to step 845 and PON controller 320 discards the packet.

From step 845, flowchart 800 transitions to step 850 where PON controller 325 makes a further decision: if the remaining quota count for the marker type indicating packets that are guaranteed to be transmitted upstream with a high probability is not zero, then flow chart transitions back to step 820, else flowchart 800 ends at step 855. In another embodiment, in step 850, PON controller 325 makes a decision to transition back to step 820 only if both the remaining quota counter for the marker type indicating packets that are guaranteed to be transmitted upstream with a high probability and the remaining quota counter for the marker type indicating packets that are eligible, but not guaranteed, to be transmitted upstream are both zero, else flowchart 800 ends at step 855.

It will be appreciated that the above described embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals.

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An optical network unit (ONU) comprising:
   a user network interface configured to receive from a network a plurality of packets to be transmitted upstream over a passive optical network (PON), wherein each of the plurality of packets is marked with, or classified as belonging to, a first category type or a second category type;
   an upstream first in, first out (FIFO) queue that stores the plurality of packets to maintain an order as to when each of the plurality of packets is received from the network;
   a quota counter configured to maintain a first quota count value, initialized to a first total upstream transmission quota for data stored in the upstream FIFO queue marked with, or classified according to, the first category type, and a second quota count value, initialized to a second total upstream transmission quota for data stored in the upstream FIFO queue marked with, or classified according to, the second category type; and
   a PON controller configured to remove a queued packet from a head of the upstream FIFO queue, corresponding to one of the plurality of packets, and discard the queued packet if; the queued packet is marked with, or classified as belonging to, the second category type; and an amount of data of the queued packet exceeds the second quota count value; and the first quota count value is greater than zero.

2. The ONU of claim 1, further comprising:
   a marking policer configured to mark each of the plurality of packets with the first category type or the second category type.

3. The ONU of claim 2, wherein:
   the marking policer is configured to mark a packet with the first category type if a size of the packet does not exceed a corresponding number of tokens in a committed bucket (c-bucket), and
   the c-bucket is replenished with tokens at a rate defined by a committed information rate (CIR) that represents a guaranteed bandwidth for transmitting data upstream over the PON and can store a maximum number of tokens defined by a committed burst size (CBS).

4. The ONU of claim 2, wherein:
   the marking policer is configured to mark a packet with the second category type if a size of the packet exceeds a corresponding number of tokens in a committed bucket (c-bucket) and does not exceed a corresponding number of tokens in an excess bucket (e-bucket),
   the c-bucket is replenished with tokens at a rate defined by a committed information rate (CIR) that represents a guaranteed bandwidth for transmitting data upstream over the PON and can store a maximum number of tokens defined by a committed burst size (CBS), and
   the e-bucket is replenished with tokens at a rate defined by an excess information rate (EIR) that represents a difference in bandwidth between the guaranteed bandwidth and a maximum bandwidth for transmitting data upstream over the PON and can store a maximum number of tokens defined by an excess burst size (EBS).

5. The ONU of claim 1, wherein each of the plurality of packets is marked with, or classified as belonging to, the first category type or the second category type based on their associated type, content, or size.

6. The ONU of claim 1, further comprising:
   a counter configured to maintain a first stored count value of an amount of data stored in the upstream FIFO queue marked with, or classified as belonging to, the first category type and a second stored count value of an amount of data stored in the upstream FIFO queue marked with, or classified as belonging to, the second category type.

7. The ONU of claim 6, wherein the PON controller is further configured to generate a report message conveying the first stored count value and the second stored count value and to transmit the report message to an optical line terminal (OLT) upstream over the PON.

8. An optical network unit (ONU) comprising:
   a user network interface configured to receive from a network a plurality of packets to be transmitted upstream over a passive optical network (PON), wherein each of the plurality of packets is marked with, or classified according to, a first category type or a second category type;
   an upstream first in, first out (FIFO) queue that stores the plurality of packets to maintain an order as to when each of the plurality of packets is received from the network;
   a PON controller configured to receive a gate message from an optical line terminal (OLT) that conveys an upstream grant to the ONU and, based on the upstream grant, determine a first total upstream transmission quota for data stored in the upstream FIFO queue marked with, or classified according to, the first category type and a second total upstream transmission quota for data stored in the upstream FIFO queue marked with, or classified according to, the second category type; and
   a quota counter configured to maintain a first quota count value, initialized to the first total upstream transmission quota, and a second quota count value, initialized to the second total upstream transmission quota,
   wherein the PON controller is further configured to remove a queued packet from a head of the upstream FIFO queue and discard the queued packet if: the queued packet is marked with, or classified as belonging to, the second category type; and an amount of data of the queued packet exceeds the second quota count value; and the first quota count value is greater than zero.

9. The ONU of claim 8, wherein the PON controller is further configured to prepare the queued packet for transmission over the PON if the queued packet is marked with, or classified as belonging to, the first category type and the amount of data of the queued packet does not exceed the first quota count value.

10. The ONU of claim 9, wherein the PON controller is further configured to decrement the first quota count value by the amount of data of the queued packet if the queued packet is marked with, or classified as belonging to, the first category type and the amount of data of the queued packet does not exceed the first quota count value.

11. The ONU of claim 8, wherein the PON controller is further configured to prepare the queued packet for transmission over the PON if the queued packet is marked with, or classified as belonging to, the second category type and the amount of data of the queued packet does not exceed the second quota count value.

12. The ONU of claim 11, wherein the PON controller is further configured to decrement the second quota count value by the amount of data of the queued packet if the queued packet is marked with, or classified as belonging to, the second category type and the amount of data of the queued packet does not exceed the second quota count value.

13. The ONU of claim 8, further comprising:
a marking policer configured to mark each of the plurality of packets with the first category type or the second category type.

14. A method comprising:
receiving from a network a plurality of packets to be transmitted upstream over a passive optical network (PON), wherein each of the plurality of packets is marked with, or classified according to, a first category type or a second category type;
storing the plurality of packets in an upstream first in, first out (FIFO) queue to maintain an order as to when each of the plurality of packets is received from the network;
maintaining a first quota count value, initialized to a first total upstream transmission quota for data stored in the upstream FIFO queue marked with, or classified according to, the first category type, and a second quota count value, initialized to a second total upstream transmission quota for data stored in the upstream FIFO queue marked with, or classified according to, the second category type;
removing a queued packet from a head of the upstream FIFO queue; and
discarding the queued packet if: the queued packet is marked with, or classified as belonging to, the second category type; and an amount of data of the queued packet exceeds the second quota count value; and the first quota count value is greater than zero.

15. The method of claim 14, wherein each of the plurality of packets is marked with, or classified according to, the first category type or the second category type based on their associated type, content, or size.

16. The method of claim 14, further comprising:
determining a first amount of data stored in the upstream FIFO queue marked with, or classified according to, the first category type and a second amount of data stored in the upstream FIFO queue marked with, or classified according to, the second category type.

17. The method of claim 16, further comprising:
generating, a report message conveying the first amount of data and the second amount of data; and
transmitting the report message to an optical line terminal (OLT) upstream over the PON.

18. A method comprising:
receiving from a network a plurality of packets to be transmitted upstream over a passive optical network (PON), wherein each of the plurality of packets is marked with, or classified according to, a first category type or a second category type;
storing the plurality of packets of data in an upstream first in, first out (FIFO) queue to maintain an order as to when each of the plurality of packets is received from the network;
receiving a gate message from an optical line terminal (OLT) that conveys an upstream grant;
based on the upstream gram, determining a first total upstream transmission quota for data stored in the upstream FIFO queue marked with, or classified according to, the first category type and a second total upstream transmission quota for data stored in the upstream FIFO queue marked with, or classified according to, the second category type;
maintaining a first count value initialized to the first total upstream transmission quota and a second count value initialized to the second total upstream transmission quota;
removing a queued packet marked with, or classified according to, the second category type from a head of the upstream FIFO queue; and
discarding the queued packet if an amount of data of the queued packet exceeds the second count value and the first count value is greater than zero.

19. The method of claim 18, further comprising:
if the queued packet is marked with, or classified as belonging to, the first category type and the amount of data of the queued packet does not exceed the first quota count value, then:
preparing the queued packet for transmission over the PON, and
decrementing the first quota count value based on the amount of data of the queued packet.

20. The method of claim 18, further comprising:
if the queued packet is marked with, or classified as belonging to, the second category type and the amount of data of the queued packet does not exceed the second quota count value, then:
preparing the queued packet for transmission over the PON, and
decrementing the second quota count value based on the amount of data of the queued packet.

* * * * *

UNITED STATES PATENT AND TRADEMARK OFFICE
CERTIFICATE OF CORRECTION

| | | |
|---|---|---|
| PATENT NO. | : 8,964,538 B2 | |
| APPLICATION NO. | : 13/173206 | |
| DATED | : February 24, 2015 | |
| INVENTOR(S) | : Kramer et al. | |

It is certified that error appears in the above-identified patent and that said Letters Patent is hereby corrected as shown below:

In the Claims

Column 16, line 13, please replace "gram" with --grant--.

Signed and Sealed this
Fourteenth Day of July, 2015

Michelle K. Lee
*Director of the United States Patent and Trademark Office*